US011520373B2

(12) United States Patent
Flessas (10) Patent No.: US 11,520,373 B2
(45) Date of Patent: *Dec. 6, 2022

(54) ROBOTICALLY CONTROLLED, CONVERTIBLE STAIRCASE

(71) Applicant: Andrew Flessas, Columbia, TN (US)

(72) Inventor: Andrew Flessas, Columbia, TN (US)

( * ) Notice: Subject to any disclaimer, the term of this patent is extended or adjusted under 35 U.S.C. 154(b) by 266 days.

This patent is subject to a terminal disclaimer.

(21) Appl. No.: 16/881,903

(22) Filed: May 22, 2020

(65) Prior Publication Data

US 2020/0285272 A1    Sep. 10, 2020

Related U.S. Application Data

(63) Continuation of application No. 15/798,828, filed on Oct. 31, 2017, now Pat. No. 10,684,643, which is a
(Continued)

(51) Int. Cl.
| | |
|---|---|
| *G06F 3/147* | (2006.01) |
| *B25J 18/04* | (2006.01) |
| *G06F 1/16* | (2006.01) |
| *H04N 9/31* | (2006.01) |
| *G06F 3/14* | (2006.01) |
| *G09G 5/00* | (2006.01) |
| *G03B 21/54* | (2006.01) |
| *G03B 21/14* | (2006.01) |

(Continued)

(52) U.S. Cl.
CPC ........... *G06F 1/1601* (2013.01); *B25J 18/04* (2013.01); *G03B 21/145* (2013.01); *G03B 21/54* (2013.01); *G06F 3/147* (2013.01); *G06F 3/1446* (2013.01); *G09F 9/3026* (2013.01); *G09G 5/00* (2013.01); *H04N 9/3147* (2013.01); *G09F 9/30* (2013.01); *G09F 19/228* (2013.01); *G09G 2300/026* (2013.01); *Y10S 901/02* (2013.01); *Y10S 901/23* (2013.01)

(58) Field of Classification Search
CPC ...................................................... B25J 18/04
See application file for complete search history.

(56) References Cited

U.S. PATENT DOCUMENTS

| | | |
|---|---|---|
| 4,868,473 A | 9/1989 | Kato |
| 5,078,021 A | 1/1992 | Freywiss |

(Continued)

FOREIGN PATENT DOCUMENTS

| | | |
|---|---|---|
| JP | 2000-267579 A | 9/2000 |
| KR | 10-2004-0096097 A | 11/2004 |

OTHER PUBLICATIONS

International Search Report and Written Opinion for Application No. PCT/US15/46278; 12 pages; dated Nov. 23, 2015.
(Continued)

*Primary Examiner* — Thomas Randazzo
(74) *Attorney, Agent, or Firm* — Weide & Miller, Ltd.

(57) ABSTRACT

A convertible panel includes a number of sub-panels which are movable between a first position in which the panels extend in the same plane to define a unified panel and a configuration in which one or more of the panels are moved into other planes which allow them to form steps. Multiple of the rotated panels may form a sequence of steps, e.g. a staircase. The convertible panel may be moved via a robotic mount, whereby the position or orientation of the convertible panel may be changed.

20 Claims, 8 Drawing Sheets

Related U.S. Application Data continuation of application No. 14/469,198, filed on Aug. 26, 2014, now Pat. No. 9,823,693.

(51) Int. Cl.
  *G09F 9/302* (2006.01)
  *G09F 9/30* (2006.01)
  *G09F 19/22* (2006.01)

(56) References Cited

U.S. PATENT DOCUMENTS

| | | |
|---|---|---|
| 5,413,454 A | 5/1995 | Movsesian |
| 5,448,225 A | 9/1995 | Maignon et al. |
| 5,496,086 A | 3/1996 | Adrian et al. |
| 5,628,660 A | 5/1997 | Onitsuka |
| 5,652,849 A | 7/1997 | Conway et al. |
| 5,683,068 A | 11/1997 | Chase et al. |
| 5,687,939 A | 11/1997 | Moscovitch |
| 5,708,527 A | 1/1998 | Adamson et al. |
| 5,773,984 A | 6/1998 | Suyama et al. |
| 5,909,998 A | 6/1999 | Herbermann et al. |
| 5,947,429 A | 9/1999 | Sweere et al. |
| 5,969,501 A | 10/1999 | Glidden et al. |
| 6,046,711 A | 4/2000 | Kouchi |
| 6,085,670 A | 7/2000 | Genov |
| 6,095,476 A | 8/2000 | Mathis |
| RE36,978 E | 12/2000 | Moscovitch |
| 6,212,784 B1 | 4/2001 | Pittman |
| 6,328,206 B1 | 12/2001 | Schanz et al. |
| 6,427,823 B1 | 8/2002 | Ishikawa |
| 6,437,973 B1 | 8/2002 | Helot et al. |
| 6,456,339 B1 | 9/2002 | Surati et al. |
| 6,507,163 B1 | 1/2003 | Allen |
| 6,655,645 B1 | 12/2003 | Lu et al. |
| 6,708,940 B2 | 3/2004 | Ligertwood |
| 6,807,461 B2 | 10/2004 | Kneifel |
| 6,826,963 B2 | 12/2004 | Liu et al. |
| 6,914,622 B1 | 7/2005 | Smith et al. |
| 7,022,962 B2 | 4/2006 | Ohtomo |
| 7,043,335 B2 | 5/2006 | Koshida et al. |
| 7,092,001 B2 | 8/2006 | Schulz |
| 7,123,285 B2 | 10/2006 | Smith et al. |
| 7,154,526 B2 | 12/2006 | Foote et al. |
| 7,163,249 B2 | 1/2007 | Schmidt et al. |
| 7,296,774 B2 | 11/2007 | Oh |
| 7,414,603 B2 | 8/2008 | Tseng |
| 7,463,821 B2 | 12/2008 | DiFrancesco et al. |
| 7,500,550 B2 | 3/2009 | Strong et al. |
| 7,545,108 B2 | 6/2009 | Flessas |
| 7,559,766 B2 | 7/2009 | Epley |
| 7,576,830 B2 | 8/2009 | DiFrancesco |
| 7,682,357 B2 | 3/2010 | Ghodoussi et al. |
| 7,719,222 B2 | 5/2010 | Theobald |
| 7,720,570 B2 | 5/2010 | Close et al. |
| 7,852,622 B2 | 12/2010 | Ferren et al. |
| 7,922,132 B2 | 4/2011 | Saez |
| 8,016,434 B2 | 9/2011 | Turner et al. |
| 8,179,337 B2 | 5/2012 | Wilzbach et al. |
| 8,302,488 B2 | 11/2012 | Hsu et al. |
| 8,356,704 B2 | 1/2013 | Flessas |
| 8,380,349 B1 | 2/2013 | Hickman et al. |
| 8,825,225 B1 | 9/2014 | Stark et al. |
| 8,896,242 B2 | 11/2014 | Flessas |
| 8,944,609 B2 | 2/2015 | Fox et al. |
| 9,067,322 B2 | 6/2015 | Keibel et al. |
| 10,684,643 B2 * | 6/2020 | Flessas .................. G06F 3/147 |
| 2003/0089267 A1 | 5/2003 | Ghorbel et al. |
| 2003/0135203 A1 | 7/2003 | Wang et al. |
| 2003/0144649 A1 | 7/2003 | Ghodoussi et al. |
| 2004/0066612 A1 | 4/2004 | Yu |
| 2004/0199290 A1 | 10/2004 | Stoddard |
| 2004/0202445 A1 | 10/2004 | DiFrancesco |
| 2004/0249507 A1 | 12/2004 | Yoshida et al. |
| 2005/0038416 A1 | 2/2005 | Wang et al. |
| 2005/0110867 A1 | 5/2005 | Schulz |
| 2005/0219356 A1 | 10/2005 | Smith et al. |
| 2006/0061124 A1 | 3/2006 | Schmidt et al. |
| 2006/0074525 A1 | 4/2006 | Close et al. |
| 2006/0184272 A1 | 8/2006 | Okazaki et al. |
| 2007/0064092 A1 | 3/2007 | Sandberg et al. |
| 2007/0086155 A1 | 4/2007 | Chen et al. |
| 2007/0177339 A1 * | 8/2007 | Flessas ................ G06F 1/1601 361/679.06 |
| 2007/0195271 A1 | 8/2007 | De Zwart et al. |
| 2008/0158801 A1 | 7/2008 | Mathews |
| 2009/0237873 A1 | 9/2009 | Flessas |
| 2009/0303447 A1 | 12/2009 | Turner et al. |
| 2010/0091688 A1 | 4/2010 | Staszewski et al. |
| 2010/0140046 A1 | 6/2010 | Flessas |
| 2010/0145512 A1 | 6/2010 | Flessas |
| 2011/0249201 A1 | 10/2011 | Turner et al. |
| 2012/0105742 A1 | 5/2012 | Davis et al. |
| 2012/0170000 A1 | 7/2012 | Imaoka et al. |
| 2012/0176740 A1 * | 7/2012 | Nagasaki ............. G06F 1/1681 361/679.01 |
| 2012/0224311 A1 | 9/2012 | Sutherland |
| 2013/0148038 A1 * | 6/2013 | Flessas ................ H04N 9/3102 348/789 |
| 2013/0181901 A1 | 7/2013 | West |
| 2014/0025202 A1 | 1/2014 | Umeno et al. |
| 2014/0031983 A1 | 1/2014 | Low et al. |
| 2014/0102239 A1 | 4/2014 | Umeno |
| 2014/0233099 A1 | 8/2014 | Stark et al. |
| 2015/0015781 A1 | 1/2015 | Flessas |
| 2015/0015785 A1 | 1/2015 | Flessas |

OTHER PUBLICATIONS

USPTO Office Action for U.S. Appl. No. 14/502,495 dated Sep. 16, 2015.
USPTO Office Action for U.S. Appl. No. 14/502,398 dated Aug. 4, 2015.
USPTO Office Action for U.S. Appl. No. 11/700,535 dated Sep. 11, 2008.
USPTO Office Action for U.S. Appl. No. 12/455,638 dated May 26, 2010.
USPTO Office Action for U.S. Appl. No. 12/455,638 dated Feb. 15, 2011.
USPTO Office Action for U.S. Appl. No. 12/653,058 dated Oct. 7, 2011.
USPTO Office Action for U.S. Appl. No. 12/653,058 dated Apr. 25, 2012.

* cited by examiner

ROBOTICALLY CONTROLLED, CONVERTIBLE STAIRCASE

RELATED APPLICATION DATA

This application is a continuation of U.S. patent application Ser. No. 15/798,828, filed Oct. 31, 2017, which is a continuation of U.S. patent application Ser. No. 14/469,198, filed Aug. 26, 2014, now U.S. Pat. No. 9,823,693, which prior applications are incorporated in their entirety as if set forth fully herein.

FIELD OF THE INVENTION

The present invention relates to entertainment elements and the movement of entertainment elements.

BACKGROUND OF THE INVENTION

A wide variety of devices are used for entertainment purposes. For example, electronic displays are now extremely common and are utilized in a variety of environments. Such displays were initially used primarily in television sets and were later used with computers. Initially, these displays were primarily CRT type displays which were large and bulky.

In recent years, other display technologies have been developed. Plasma, LCD, LED and other types of displays are now commercially producible in large display sizes. At the same time, however, these displays are generally thin, thus taking up much less space than CRT type displays offering the same display area.

As such, these displays are now utilized for a variety of purposes. For example, large displays are used at stadiums to present replays of sporting events. These types of displays are also sometimes mounted to walls in stores to present advertising information.

In order to attract attention to advertising, graphic information may be presented on the displays. This information may comprise exciting patterns, such as in bright colors, flashing effects and the like, to draw attention to the display. Still, these displays may be overlooked and advertisers and other users of these displays continue to seek new ways to use these displays and increase their viewership.

Other types of entertainment devices may be used in other settings. For example, in a theatrical production, large props may be located on a stage. The props may be moved into various positions to create different scenes and various actions. The props are often moved manually, such as with ropes and pulleys, limiting the situations where they may be used or their effectiveness. To move some props, ladders or stepping stools may be required. Further, ladders and stepping stools or grounded staircases could be used themselves as props.

Various problems exist when moving these types of entertainment devices or objects or in configuring them for use.

SUMMARY OF THE INVENTION

The invention comprises moveable entertainment elements and methods of moving one or more entertainment elements.

One embodiment of the invention is a robotic mount. The robotic mount is configured to support one or more entertainment elements such as displays, projectors, a fixed or convertible staircase, and move the one or more entertainment elements in at least two dimensions or directions, and preferably in three-dimensions/three-dimensional space. In one embodiment, the robotic mount comprises a base and a movable support. The base supports the display support, such as by resting upon a support surface or by connection to a support, such as a wall or other element.

The moveable support is preferably movable in three dimensions or directions, whereby one more entertainment elements connected thereto are so movable (such as in six (6) degrees of freedom). In one embodiment, the moveable support comprises a plurality of members which are movably connected to one another in one more directions/dimensions. The moveable support may comprise, for example, a robotic arm having a base, a main support which is rotatable relative to the base, a lower arm which is rotatable relative to the main support, an upper arm which is rotatable relative to the lower arm, and a head to which the one or more entertainment elements are connected, the head movable relative to the upper arm.

In one embodiment, means are provided for moving the moveable support. Preferably, the means permits the moveable mount to be automated in the sense that it can be moved without direct physical contact by a human therewith. This means may comprise one or more electric motors or the like.

One embodiment of the invention comprises a convertible panel or staircase that can be configured as a generally planar panel or be converted to a staircase, e.g. having one or more steps. The convertible staircase comprises a plurality of sub-panels that in one position form a planar panel. When functioning as a staircase, one or more of the sub-panels are moved (such as by rotation) to a position in which they extend outwardly at an angle which allows faces or surfaces of the sub-panels to be used as supporting surfaces, such as steps or stairs. In one embodiment, the position of the entire convertible panel or staircase is changeable, such as via a robotic mount which supports the convertible panel/staircase. The robotic mount is preferably configured to move the convertible panel/staircase (e.g. whether in its configuration as a generally planar or in its configuration as a staircase) in three-dimensional space to provide the same uses as those intended for a unitary panel (e.g. whereby the position of the unitary panel may be changed) or robotically controlled staircase (e.g. whereby the position of the staircase may be changed).

In one embodiment, the sub-panels of the convertible staircase comprise video display panels. When in the planar position, the individual video display sub-panels form a single larger unitary video display panel. However, the video display sub-panels may be moved to form one or more steps of the staircase.

One embodiment of the invention is a system including a robotic mount and a controller. The controller may be configured to accept input from a user and/or run control programs for generating instructions or output signals which may be used to control the robotic mount and its associated entertainment element (such as its associated video display(s), video projector(s), staircase, etc.). In one embodiment, such a controller may also be configured to control information displayed by the one or more video display sub-panels, including synchronizing the movement thereof with the images displayed thereby.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
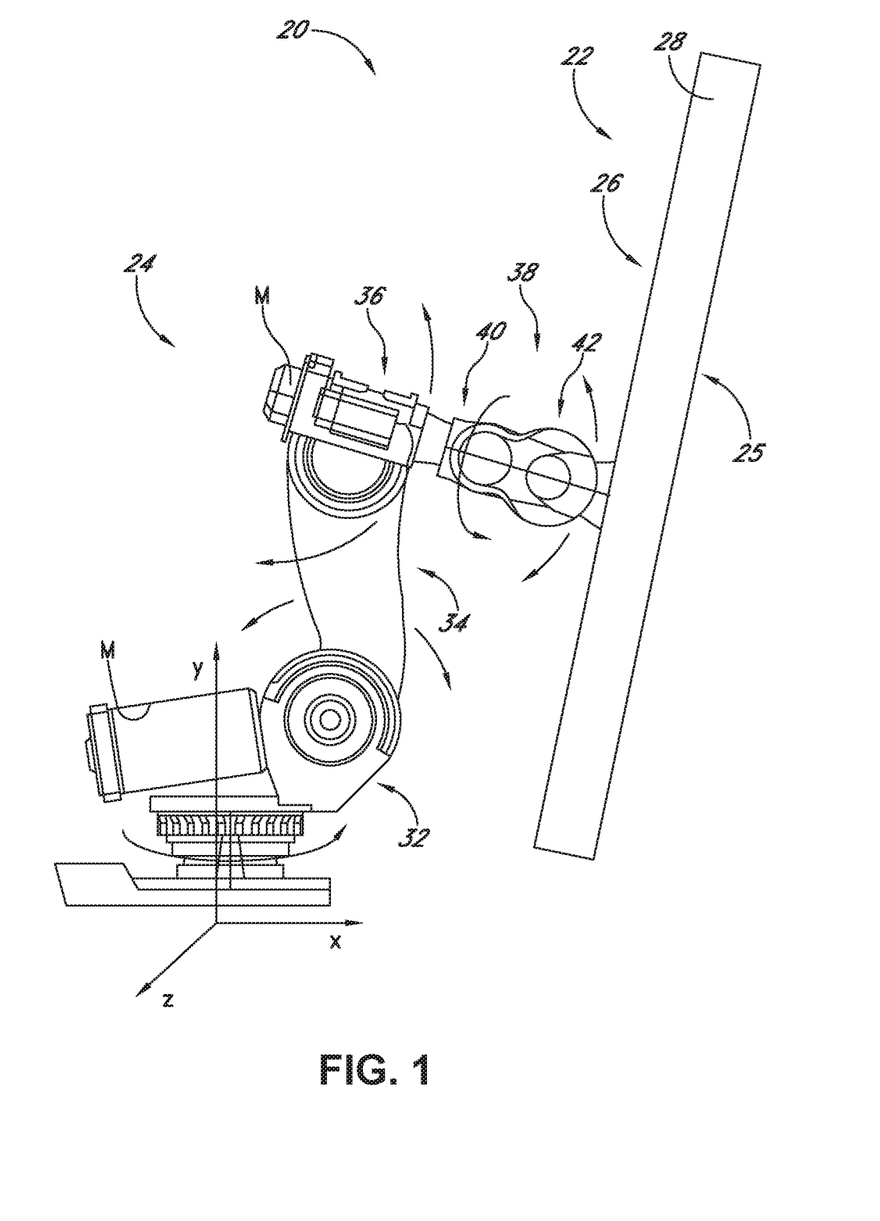
FIG. 1 is a side view of a robotically controlled electronic display in accordance with an embodiment of the invention.

In general, the invention comprises one or more robotically-controlled objects and objects which are moved by one or more robots, such as electronic displays, projectors, a staircase, or other elements. One embodiment of the invention is a robotically controlled electronic display and methods of using robotically controlled electronic displays, such as methods of moving one or more electronic displays of a group of displays. Another embodiment is a robotically controlled video projector and methods of using robotically controlled projectors to display images. Yet another embodiment of the invention is a robotically controlled staircase, such as a fixed or convertible staircase, and methods of moving a staircase using one or more robots FIG. 1 illustrates a robotically controlled electronic display 20 in accordance with an embodiment of the invention. As illustrated, the robotically controlled electronic display 20 comprises at least one electronic display 22 and a robotic or moveable display mount 24. In a preferred embodiment, the electronic display 22 is a thin-panel type display, such as an LCD, LED, plasma or similar display (whether now known or later developed). In one embodiment, the electronic display 22 has a front or viewing side 25 and an opposing rear side 26. The electronic display 22 has a peripheral edge 28.

In one embodiment, the electronic display 22 is generally rectangular in shape, but the display 22 may have a variety of shapes. The electronic display 22 may have a display area at the front side 25, which display area is enclosed by a bezel, frame or the like. The display area comprises the portion of the electronic display 22 which is capable of displaying information.

In a preferred embodiment, the electronic display 22 is relatively large, such as for viewing by person situation remotely there from. The electronic display 22 may be 20 inches in diagonal size (of display area), more preferably at least 36 inches in diagonal size, and even more preferably a least 50-60 inches or more in diagonal size. The electronic display 22 might comprise a single electronic video display or more than one display (such as two or more displays which are closely located or joined together). The electronic display 22 may be of various types such as CRT, LED, LCD, plasma, etc. and may include touch-screen features, such an overlying touch-sensitive screen.

The electronic display 22 is supported by the robotic mount 24. In a preferred embodiment, the robotic display mount 24 is moveable, thus permitting the position of the electronic display 22 to be changed. As detailed below, in a preferred embodiment, the position of the electronic display 22 can be changed freely anywhere in three-dimensional space (not merely one or two dimensions, but in full three-dimensional space).

In a preferred embodiment, the robotic mount 24 is referred to as "robotic" because it is a device which can change positions without direct manual input. In particular, the robotic mount is preferably capable of multiple movements without manual intervention (i.e. move between various positions based upon a sequence of instructions without each movement being prompted by individual user input). Preferably, the robotic mount comprises a robot or robotic arm which can change the position of the display in at least two (2), and preferably three (3), dimensions or directions.

FIG. 1 illustrated one embodiment of a robotic mount 24. In one embodiment, the robotic mount 24 comprises a base and a display support. The base is configured to connect or support the display mount and associated display to a support, and the display support is preferably movable relative to the base, thus permitting an associated display to be movable relative to the base and the associated support.

Referring to FIG. 1, the base 30 [not labeled in FIG.] may have a variety of configurations, including various shapes and sizes. In general, the base 30 is configured to be mounted to or supported by a support surface, such as a wall, floor or other support, such as a portion of another object. The base 30 may have a generally planar bottom or lower surface for engaging a generally planar support surface, or may have other configurations for engaging support surfaces of other shapes. In one embodiment, the base 30 may include one or more apertures for accepting fasteners which are placed into engagement with the support surface, for securing the base 30 in a fixed position by temporarily or permanently connecting the base 30 to that surface.

In a preferred embodiment, a movable support is positioned between the base 30 and the electronic display 22. This support is preferably moveable in at least two (2), and more preferably three (3), dimensions. By two or three-dimensions it is preferably meant the standard Cartesian two or three-dimensional space, such that the support is capable of moving the display about, or relative to, at least two of an x, a y and a z axis. In a preferred embodiment, movement is permitted in all three dimensions, and preferably providing six (6) degrees of freedom. As disclosed below, the robotic mount 24 may permit redundant movement in one or more directions. For example, the robotic mount 24 may include two or more elements which permit it to be moved in the x, y and/or z direction, or to rotate about the x, y and/or z axis.

As illustrated, in one embodiment, the robotic arm includes a main support 32. In one embodiment, the main support 32 is mounted for rotation relative to the base 30, i.e. about the y-axis as illustrated in FIG. 1. The main support 32 may be mounted, for example, on a bearing supported shaft which is connected to the base 30, or by other means.

In one embodiment, a lower arm 34 is rotatably mounted to the main support 32. As illustrated, the main support 32 has a first portion mounted to the base 30 and a second portion to which the lower arm 34 is mounted. In a preferred embodiment, the lower arm 34 is rotatably mounted to the main support 32 about a shaft or other mount. In the configuration illustrated, the lower arm 34 is mounted for rotation about a z-axis (i.e. an axis which is generally perpendicular to the axis about which the base 30 rotates).

As further illustrated, an upper arm 36 is rotatably mounted to the lower arm 34. In one embodiment, a first or distal portion of the lower arm 34 is mounted to the main support 32, and the upper arm 36 is mounted to a top or proximal portion of the lower arm 34. In one embodiment, the upper arm 36 is also mounted for rotation about the z axis.

In one embodiment, a head 38 is located at a distal portion of the upper arm 36. Preferably, the display 25 is mounted to the mount 24 via the head 38. In one embodiment, the head 38 is mounted for rotation relative to the upper arm 36 (and thus the remainder of the mount 24). In one configuration, a first portion 40 of the head 38 is mounted for rotation about an x axis relative to the upper arm 36 (i.e., about an axis which is perpendicular to both the y and z axes, and thus about an axis which is generally perpendicular to the axis about which the main support 32 and upper and lower arms 36, 34 rotate).

Further, in the embodiment illustrated, a second portion 42 of the head 38 is mounted for rotation relative to the first portion 40 and the upper arm 36, about the z-axis. As illustrated, the display 22 is mounted to the second portion 42 of the head 38.

The various portions of the mount 24 may be connected to one another in a variety of fashions. For example, the various portions may be connected to one another via a shaft and bearing mount, where the shaft is connected to one component and engages one or more bearings supported by the other component, such that the shaft may move relative to the bearing(s), thus permitting the components to move relative to one another. The portions of the mount 24 might be mounted to one another in other fashions, however, such as by hinged mounting or the like.

Preferably, the mount 24 includes means for moving the one or more portions thereof, and thus the display 22 connected thereto. As illustrated, the mount 24 may include one or more motors M for moving the components thereof. The motors M may be electrical motors. In other embodiments, hydraulics or other means may be utilized to move one or more of the components of the mount 24. For example, a hydraulic arm might be utilized to move the upper arm 36 relative to the lower arm 34 in an up and down direction.

In one embodiment, the display 22 may be detachably connected to the mount 24, such as to permit the display 22 to be changed or serviced. The display 22 might be connected to a supporting frame, for example. That frame might then be connected to the mount 24, such as by connecting the frame to the head 38 with one or more fasteners.

As indicated, in a preferred embodiment, the mount 24 is configured to move the display 22 in three-dimensions, or combinations thereof. The particular configuration of the mount 24 may vary for accomplishing this task. For example, while the mount 24 described above is redundant in its capacity to move in certain directions (i.e. the upper and lower arms 36, 34 are both configured to move about the z axis), the mount 24 could be configured in other fashions (such as by having only a single portion configured to move in each direction). It will also be appreciated that the number of members or elements which the display mount comprises may vary. For example, the display mount might comprise a base and a head which is mounted to the based, such as via a swivel, permitting the head to be moved in at least two dimensions. Various configurations of members may also be utilized to effect movement in various directions. For example, aside from swivels or the rotating connections of the display mount illustrated in FIG. 1, members may be configured to telescope, slide or otherwise move linearly (i.e. move along an axis rather than about an axis), or be configured to move along paths other than curved paths. For example, the mount 24 may be configured to move about the "x" axis, such as to permit the display to be tilted up and down, to move about the "y" axis, such as to permit the display to be swiveled from side to side, and to simply move along the "z" axis, such as to permit the display to be moved in and out (such as towards or away from a wall/viewer).

In the embodiment illustrated, a single display 22 is connected to a single mount 24. In another embodiment of the invention, referring to FIG. 2, a unitary display 122 may comprise a plurality of individual or independent displays 22 located in proximity to one another. In one embodiment, one or more of those individual displays 22 may be mounted to a mount 24, and thus be configured for movement.

Figure 2:
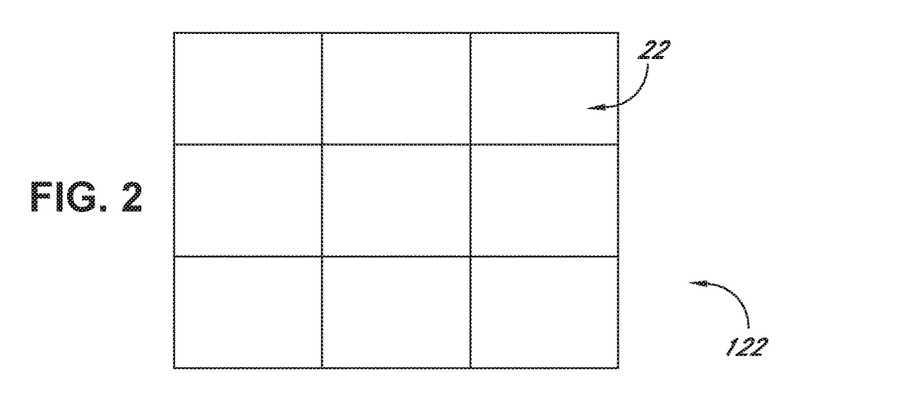
FIG. 2 illustrates a robotically controlled unitary display comprising a plurality of individual displays in accordance with another embodiment of the invention.

Two or more robotic mounts 24 may be used with one another. FIG. 2 illustrates one embodiment of a unitary display 122 comprising nine (9) displays 22. All nine displays 22 are preferably mounted to an associated mount (not shown). In this manner, each of the nine displays 22 may be moved by their associated mount.

FIG. 2 illustrates the displays 22 in an orientation where they are located adjacent to one another in a matrix, and in a common plane. In the configuration illustrated, there is a central display surrounded by top, bottom, side and corner displays.

Figure 3:
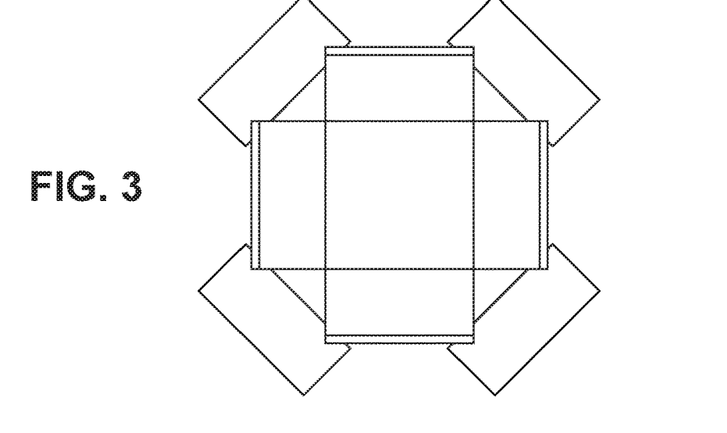
FIG. 3 illustrates the unitary display of FIG. 2 with various of the individual displays moved into different positions.

The displays 22 may be moved, however, to other locations and thus other orientations or positions relative to one another. For example, FIG. 3 illustrates the displays 22 in a flower configuration where the top, bottom and side displays are tilted forward relative to the plane which contains the central display. The corner displays are rotated and then similarly tilted inwardly. In this configuration, the displays are positioned like the slightly closed pedals of a rose or other flower.

Figure 4:
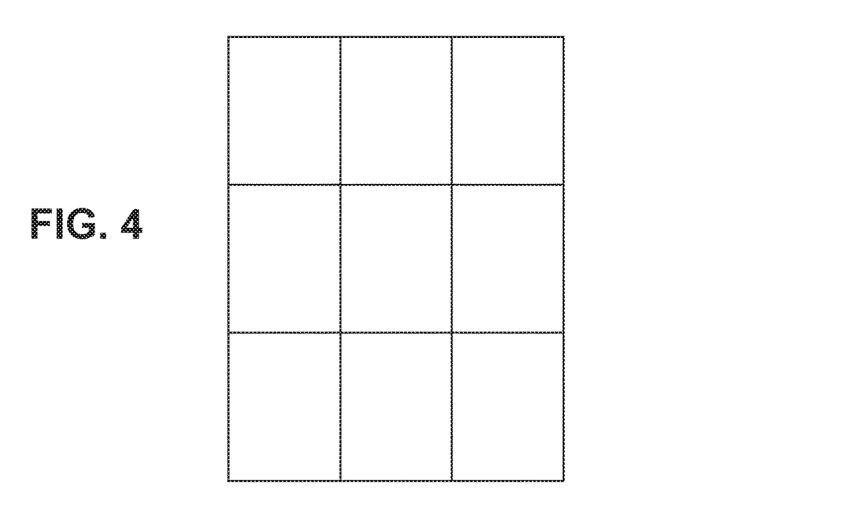
FIG. 4 illustrates the unitary display of FIG. 2 with the individual displays moved into different positions.

FIG. 4 illustrates the displays 22 again arranged in a matrix and in a single plane. However, in this configuration, the displays 22 have all been rotated 90 degrees, so that the unitary display 122 is taller than wider.

In one embodiment, each display 22 of the unitary display 122 has an associated robotic mount. In this manner, each display 22 may be moved independently of the other. In another embodiment, multiple displays may be coupled to or otherwise associated with a single mount (such that groups of displays are movable together). In yet another embodiment, one or more of the displays 22 may be fixed and others may be connected to a mount 24 for movement.

In one embodiment, means may be provided for controlling a single mount (such as illustrated in FIG. 1) or one or more or all of a plurality of mounts associated with a unitary display (such as illustrated in FIG. 2). In one embodiment, one or more mounts may be controlled by a controller. The controller might comprise, for example, an electronically or mechanically operated controller.

In a preferred embodiment, the controller may comprise or include a computing device. Various instructions may be provided from the controller to the one or more robots/robotic mounts, causing the robots/robotic mounts to move. For example, a user might provide an input to the controller, which input is a request to move a particular display from a first to a second position. The controller may generate one more signals or instructions which are transmitted to the required mount for causing the mount to so move the display. The signal might comprise opening of a switch which allows electricity to flow to one or more motors for a predetermined period time which is necessary for the motor to affect the desired movement. In another embodiment, the signal might comprise an instruction which is received by sub-controller of the mount, which sub-controller then causes the mount to move as desired.

In one embodiment, the controller may be configured to cause a single mount or multiple mounts to move in various patterns or other desired directions. For example, the controller might be programmed to cause the displays to move in a particular pattern. Referring to FIGS. 2-4, for example, the controller may be configured to move the displays from the position illustrated in FIG. 2 to that illustrated in FIG. 3 or 4, or vice versa. The controller may be custom-programmed or might be configured to execute pre-set sequences of movement. For example, the displays may be configured to move at certain times, into certain positions or in certain patterns, to move with music or the like (such music might be presented via speakers associated with the display or via a separate sound system or the like).

In one embodiment, the controller may include a processing unit capable of executing machine readable code or "software. As indicated, that software may comprise a set of instructions which, when executed, cause the controller to move one or more displays in a predetermined motion or pattern, randomly or otherwise. The software might also or instead simply comprise a set of instructions which permits a user to provide manual input to cause a display or displays to move, either in direct response thereto or to generate a programmed movement (which may be implemented immediately or be stored for implementation at a later time).

The controller might communicate with the robotic mount via wired or wireless communications. For example, the controller might comprise a desk-top computer running a control program. The desk-top computer might transmit signals via a RS-232 communication link including a wired pathway to the motor or controller of the robotic mount. Alternatively, the desk-top computer and display mount controller might both include wireless transceivers. In this manner, the controller and robotic mount(s) may be located remotely from one another. The same computer might output images or a video feed to the one or more displays.

In one embodiment, video information may be transmitted to the display or displays either independently of control instructions or dependently therewith. For example, the controller may be configured to both generate display information and/or transmit display information to the displays, and control the mounts. The controller might be configured to move the mounts/displays based upon the information which is displayed by the one or more displays. In one embodiment, the one or more displays may be moved synchronously with information displayed by the displays. For example, the displays might be moved synchronously with images displayed by the displays or with music or other accompanying information.

The invention has numerous advantages. One aspect of the invention is a movable display. The display may preferably be moved in three-dimensions (i.e. about three axes which are all perpendicular to one another). In one embodiment, the display is mounted to a display mount having a display support which is movable in three dimensions. Preferably, means are provided for automatically or remotely moving the display. As indicated, this may comprise changing the position of one or more portions of the robotic mount.

One aspect of the invention is a method of remotely or automatically changing the position of a display. For example, a display may be mounted to a wall or ceiling in a public area and the position of that display may be changed at various times in an automatic fashion (as opposed to manual manner, where the position is changed by a person physically moving the display or its associated mount). This has the advantage that the position of a display may be moved for various purposes, such as for entertainment, for optimizing viewing angle, for directing information to viewers in certain locations or areas, or for other reasons. The display might also be mounted to a wall of a home and be controlled by a user to change the viewing position of the display.

Figure 5:
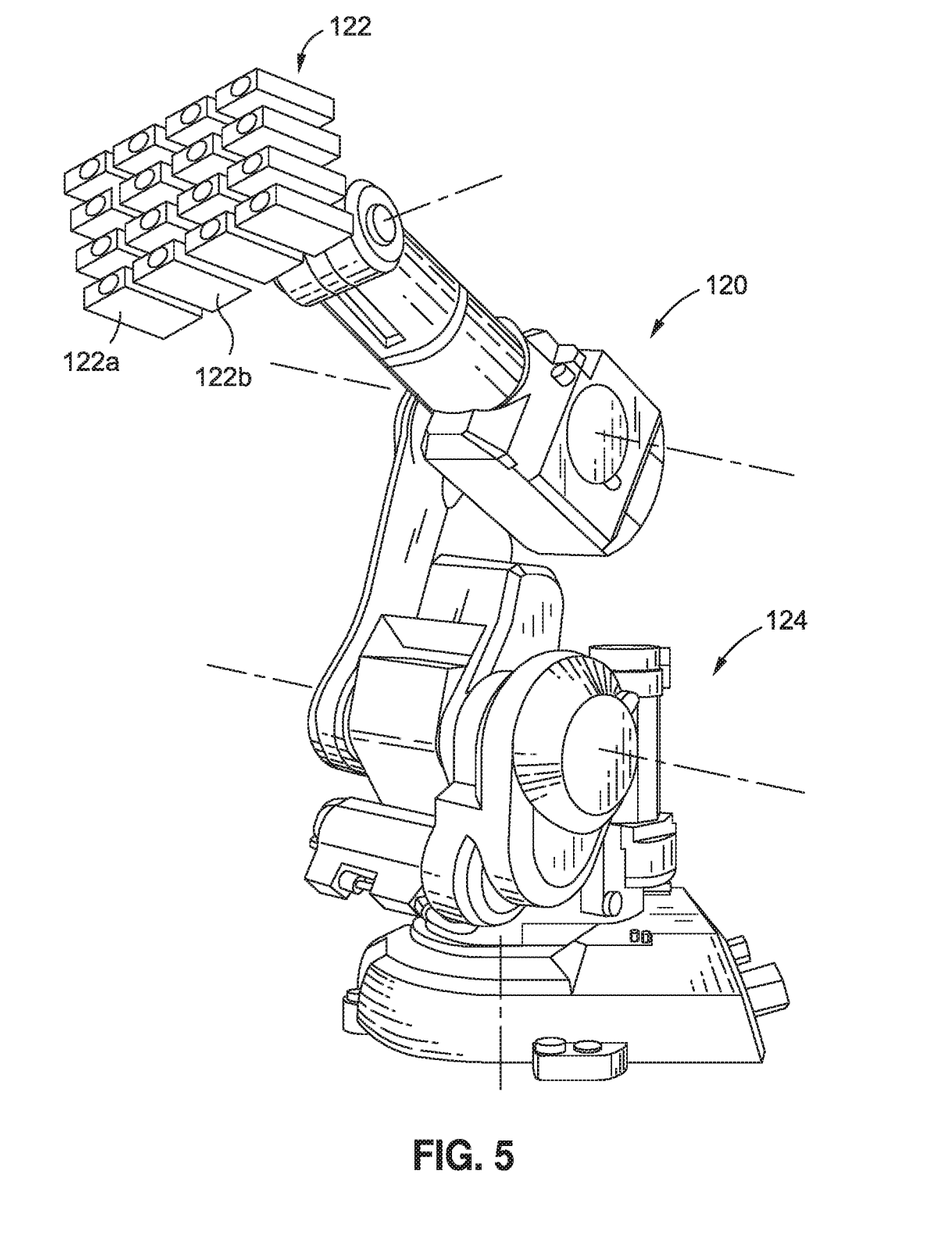
FIG. 5 illustrates a robotically controlled video projector in accordance with an embodiment of the invention.

Another embodiment of the invention is a robotically controlled projector 120. FIG. 5 illustrates one embodiment of a robotically controlled projector 120. Preferably, the robotically controlled projector 120 comprises at least one projector 122 and at least one robotic mount 124. The projector 122 may be of a variety of types now known or later developed. Preferably, the projector 120 is configured to project one or more images or a sequence of images (video) onto one or more surfaces. For example, the projector 120 might comprise a digital light processing ("DLP") projector, a CRT, LCD, or other type of projector. In one embodiment, the robotically controlled projector 120 includes a single projector. However, as illustrated, it might include a number of projectors 122*a*, 122*b*, etc.

The robotic mount 124 preferably comprises a robot or robotic arm similar to that described above and will thus not be described herein again in detail. In particular, the robotic mount 124 is configured to move the at least one projector 122 in at least two (2), and preferably three (3) dimensions. As also indicated above, the robotically controlled projector 120 may also include a controller. The controller may be configured to cause the projector 122 to display images or video at certain times, and may be configured to cause the robotic mount 124 to move the projector 122, such as in certain paths.

The projector 122 is preferably mounted to the robotic mount 124. The mount 124 may be used to move the projector 122, thus causing the projector 122 to display images or video at various locations. For example, a robotically controlled projector 120 might be located in a lobby and be used to display various information or images upon a screen or another projection surface such as a wall, a floor or the like. The robotically controlled projector 120 might be used in a theater to project background images or the like.

It will be appreciated that, like the robotically controlled display described above, more than one robotically controlled projector 120 might be used in tandem. For example, two robotically controlled projectors 120 might each have a single projector 122. The two robotically controlled projectors 120 may be configured to move in various patterns together or independent of one another, such as to show joint images, synchronous images or the like.

Of course, various other of the features of the robotically controlled display 20 described above may be applied to the robotically controlled projector 120.

Figure 6:
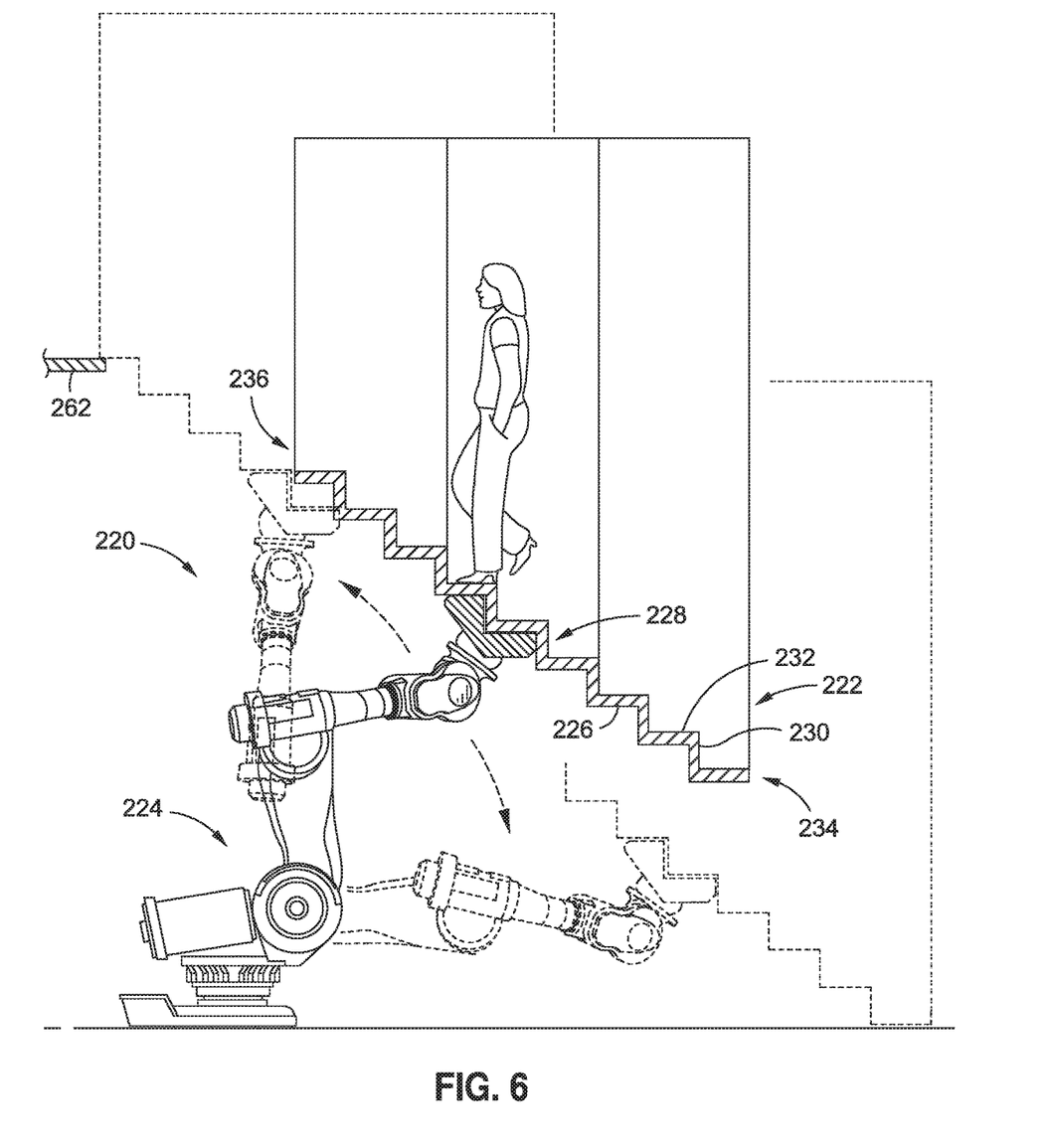
FIGS. 6 and 7 illustrate a robotically controlled staircase in accordance with an embodiment of the invention.
Figure 7:
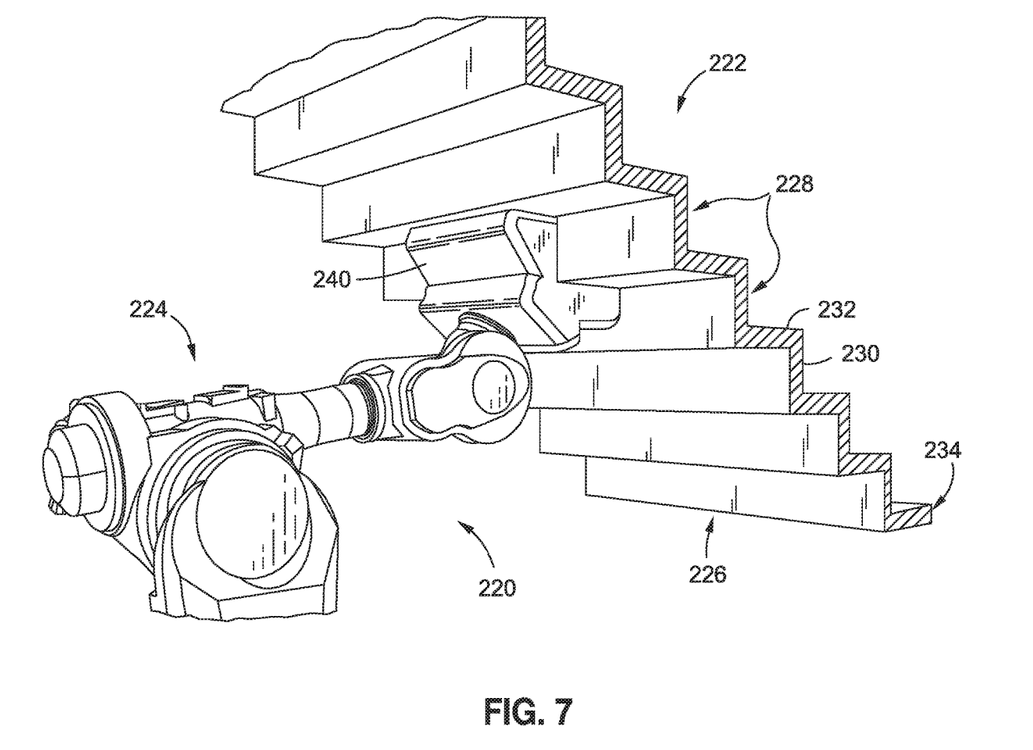

Yet another embodiment of the invention comprises a robotically controlled staircase 220. FIGS. 6 and 7 illustrate a robotically controlled staircase 220. The robotically controlled staircase 220 comprises a staircase 222 and a robot or robotic mount 224 which is configured to move the staircase 222.

The staircase 222 may have various configurations. In one embodiment, the staircase 222 comprises a supporting body or structure 226. The staircase 222 preferably includes a plurality of steps 228. Each step 228 may comprise a riser 230 and a landing 232. Each riser 230 preferably extends generally vertically upward. The number of steps 228, and thus the number of risers 230, may vary. Preferably, there is at least one step 228. More preferably, however, there are a plurality of steps 228. The depth of each landing 232 and the height of each riser 230 may be configured to conform to local building or other codes.

Preferably, the staircase 222 has a first or bottom end 234 and a second or top end 236. The top end 236 is preferably higher than the bottom end 234. The total change in elevation is dependent upon the number of steps 228 and the height of the risers 230. The staircase 222 may be straight or it might be spiral, have one or more bends or the like.

In one embodiment, the staircase 222 may be configured to mate with one or more other elements or structures. For example, the staircase 222 may be configured to dock or mate to a supporting platform (not shown). To this end, the top end 236 and bottom end 234 of the staircase 222 may end or terminate in a landing 232. This allows the top and bottom ends 236, 234 to rest upon a supporting surface or platform at generally the same elevation thereof. In one embodiment, the landing at the top end 236 and/or bottom end 234 of the staircase 222 may be larger than the step landings 232. For example, each of the top and bottom end landings may be sufficiently large to permit one more persons to easily stand thereon (whereas the step landings are primarily configured to permit a user to simply step thereon as they climb the staircase).

In one embodiment, the staircase 222 may include other features. For example, the staircase 222 may include one or more handrails (not shown). The staircase 222 has a width between opposing sides. This width may vary, such as being 36 or 48 inches, for example. A handrail may be located at each side of the staircase to prevent a user from falling off of the staircase and to provide support to users. Likewise, the landing 232 at the top end 236 and bottom end 234 of the staircase 222 may include an enclosure. Such an enclosure may be selectively opened and closed to permit ingress to and egress from the staircase, but prevent such during movement of the staircase. Such an enclosure might comprise a rail, a chain, or the like. For example, a swinging gate may be located at both the top and bottom ends 236, 234 of the staircase 222 to control ingress to and egress from the staircase 222.

In one embodiment, the body 226 of the staircase 222 might comprise a superstructure which supports the steps 228. For example, the body 226 might comprise a metal framework. The steps 228 might be constructed from wood and be supported by that framework. In another embodiment, the body 226 might define the steps 228. For example, the staircase 222 might be constructed from metal, such as step elements which are welded to one another to form a unitary structure.

The mount 224 preferably comprises a robot or robotic arm similar to that described above and will thus not be described herein again in detail (for example, such may comprise a base and a moveable support, as detailed above). In particular, the mount 224 is configured to move the staircase 222 in at least two (2), and preferably three (3) dimensions. As also indicated above, the robotically controlled staircase 220 may also include a controller to move the staircase 222 in certain paths.

As best illustrated in FIG. 7, the staircase 222 is preferably mounted to the mount 224. As illustrated, an adaptor 240 may be used to connect the staircase 222 and the robotic mount 224. The adaptor 240 may have various configurations. FIG. 7 illustrates one configuration in which the adaptor 240 engages a bottom portion of one or more of the steps 228. However, the adaptor 240 could have other configurations, such as depending upon the configuration of the staircase 222, including the body 226 or supporting structure thereof.

As illustrated in FIG. 6, the robotic mount 224 is configured to move the staircase 222 between various positions. For example, the robotic mount 224 may move the staircase 222 into a position in which its bottom end 234 is positioned on the ground. A user may then step onto the staircase 222 from the ground, such as by stepping onto a lower landing 232 thereof.

The robotic mount 224 may then be used to move the staircase 222, and the user standing thereon, to another location. In the preferred embodiment where the robotic mount 224 can move in three dimensions, the staircase 222 may be moved to various positions in three-dimensional space which vary from an initial or starting position. FIG. 6 illustrates one simplistic embodiment where the staircase 222 is moved in two dimensions: upwardly and forwardly. In this example, the staircase 222 may be moved upwardly and forwardly, such as to dock with a raised platform 262. A user might then disembark from the staircase 222 onto the platform 262.

It will be appreciated that a user may climb up and down the steps 228 of the staircase 222 both while the staircase 222 is stationary and/or while it is moving. For example, a user might board the staircase 222 at the bottom end 234 while it is stationary. As the staircase begins to move to a destination, the user might climb the steps 228 to the top end 236 of the staircase 222 to disembark the staircase 222 at the destination.

The robotically controlled staircase 220 might be used in various manners. For example, it might be used in a theater. In such an environment a singer might be transported from stage level to a platform well above stage, or from one location to another over a barrier such as a moat. The robotically controlled staircase 220 might also be used as an amusement ride. In such an embodiment, patrons might board the staircase 220 as a ride and be transported from one location to another. In one preferred embodiment, a haunted house ride might include one or more platforms in various locations. The platforms might lead to doors or other points of entry. Patrons might board the staircase and be transported to one or more of those platforms where they disembark to travel into other portions of the haunted house. In one embodiment, the staircase might move between various locations before stopping, thus providing substantial anticipation to the riders as to their final destination. It is also possible for there to be more than one robotically controlled staircase 220. The various staircases 220 might move independently between various locations. They might also move so that they join together at certain times (forming longer staircases to connect to various locations, for example) or independently at other times). As yet another example, a first robotically controlled staircase 220 might be used to move patrons from ground level to one or more platforms at a first level (above ground) and then a second robotically controlled staircase 220 might be used to move patrons from the first level to an even higher second level (or higher).

As indicated, one or more controllers may be used to control the robotically controlled staircase 220, such as to cause it to move between various locations. The patterns of movement may change over time. For example, in a haunted house ride, the robotically controlled staircase 220 might be configured to move a first set of riders from ground level to a first platform. However, the robotically controlled staircase 220 might be configured to move a second set of riders from that same ground level to a second, different platform.

Of course, the robotically controlled staircase 220 might be configured to move between various locations other than ground level and various platforms. The robotically controlled staircase 220 may include various of the other features detailed herein. For example, the robotically controlled staircase 220 may be controlled by one or more controllers, such as to move in certain patterns or paths, including synchronously with other elements. For example, the robotically controlled staircase 220 may be moved synchronously with music which is being played or with images that are being displayed.

Figure 8:
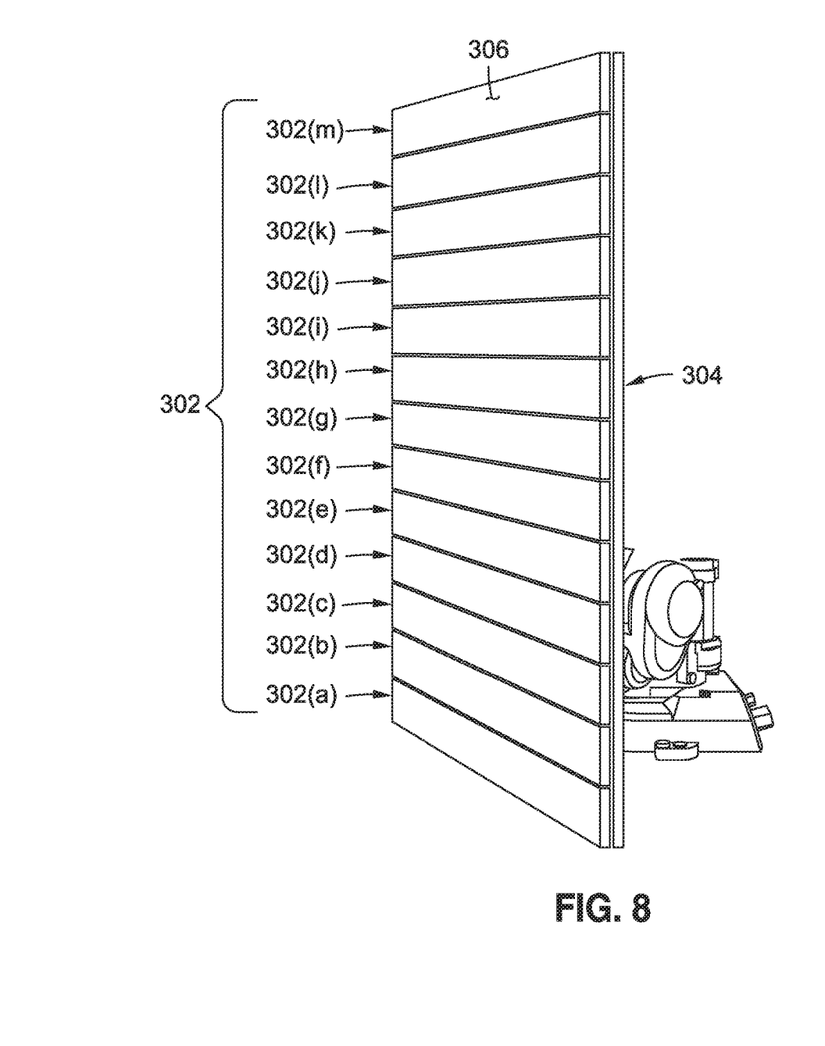
FIG. 8 illustrates an isometric view of a robotically controlled convertible panel in a planar configuration.
Figure 9:
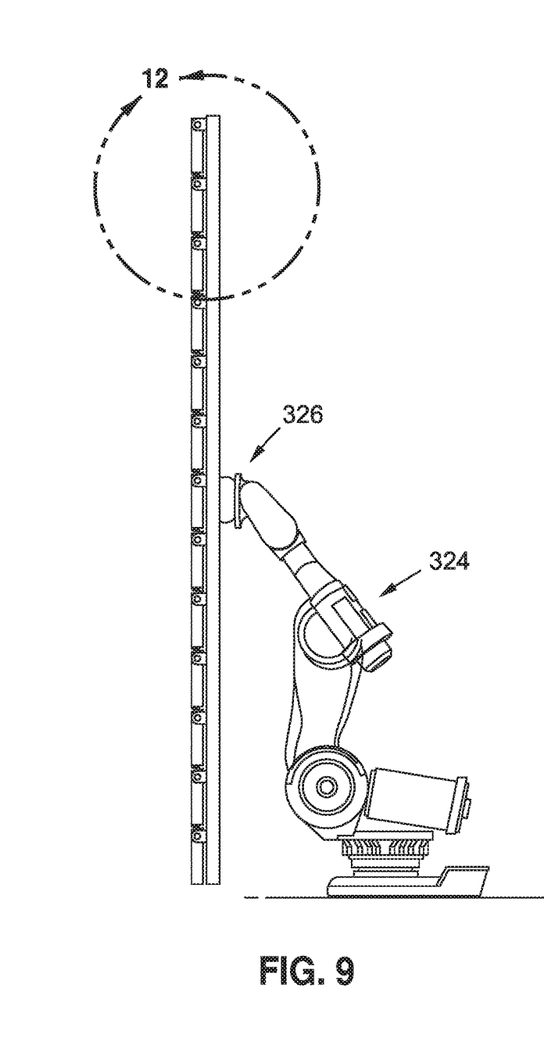
FIG. 9 illustrates a side view of a robotically controlled convertible panel in a planar unified display configuration or position.

Yet another embodiment of the invention comprises a convertible panel that can function as both a staircase and planar panel, such as a display. FIGS. 8 and 9 illustrate one embodiment of a convertible display. The convertible display comprises a plurality of sub-display elements or panels 302(*a*)-302(*m*) which cooperate to form a unified electronic display 302. In a preferred embodiment, the sub-display elements or panels 302(*a*)-302(*m*) are connected to and supported by at least one support panel 304 or other supporting structure. The support panel 304 provides structural support for the electronic display 302 and, when the support panel 304 is associated with a robotic mount, provides an interface or connection between the electronic display 302 and such a robot or robotic mount 324.

Any number of sub-displays elements or panels 302(*a*)-302(*m*) can make up the electronic display 302. Each sub-display 302(*a*)-302(*m*) need not fully extend across the electronic display 302 in one direction as shown in FIG. 8. The sub-display elements 302(*a*)-302(*m*) may be apportioned equally or non-equally across the given direction in fractional units and the electronic display 302 need not comprise the same fractional units at each position of a sub-display element along the orthogonal direction. Further, it is conceivable that the width of the sub-display elements 302(*a*)-302(*m*) may vary at different locations along the orthogonal direction. Thus, the sub-display elements 302(*a*)-302(*m*) may take on various shapes and sizes across the electronic display 302 and may preferably, but need not, maintain relative alignment with the support panel. As will become apparent, the shapes of the sub-display elements 302(*a*)-302(*m*) are only limited in shape by their functionality of being usable in forming a staircase or steps to allow a person to ascend and descend thereon. However, in a preferred embodiment, the shape of the support panel 304 and the plurality of sub-display elements 302(*a*)-302(*m*) thereon is rectangular; similar in that regard to most flat screen video displays currently existing in the art (for example, in other embodiments, the unified display could have a triangular shape in which each sub-display element or panel 302(*a*)-302(*m*) is generally trapezoidal in shape, with the width of each successively higher panel being linearly smaller).

In an embodiment where the convertible display is associated with a robotic mount, the mount 324 preferably comprises a robot or robotic arm similar to that described for the mount 124 used with the electronic display 25 of FIG. 1 and further referenced for the mount 224 used with the staircase 228 shown in FIG. 6 and will thus not be described herein again in detail (for example, such may comprise a base and a moveable support, as detailed above). In particular, the mount 324 is configured to move the convertible display in at least two (2), and preferably three (3) dimensions. As also indicated above, the robotically controlled convertible display may also include a controller to move the convertible display in certain paths and to position the electronic controller in certain orientations (which controller may also be used to synchronize movement of the display 302 with content which is displayed on the display, including relative to converting the display between its display and staircase configurations as described below).

The head 326 shown in FIG. 9 is used to connect the convertible display 302 to the mount 224. The head 326 may have various configurations, including a configuration similar to that described above for the head 38 attachment to the electronic display 22 of FIG. 1. The convertible display 302 preferably utilizes the support panel 304 to support the multiple sub-display elements 302(*a*)-302(*m*), thus preferably causing the attachment point to be the rear side of the support panel 304. Thus, the head 326 is preferably attached to the support panel 304 (and may be attached in a variety of ways using various fasteners, including through the use of hardened steel bolts, screws, rivets, or any other known fastening devices or mechanisms), between the head 326 and the support panel 304. Preferably, if a singular attachment point (including an attachment face having multiple fasteners associated therewith) is used, the head 326 is attached to the support panel 304 in alignment with the center of gravity (CG) of the convertible display for optimum stability. In an alternative embodiment, the head 326 may comprise a plurality of attachment points (or attachment faces) with the mid-point between them being the CG point. This would spread the load, accordingly, between the multiple attachment points.

Figure 10:
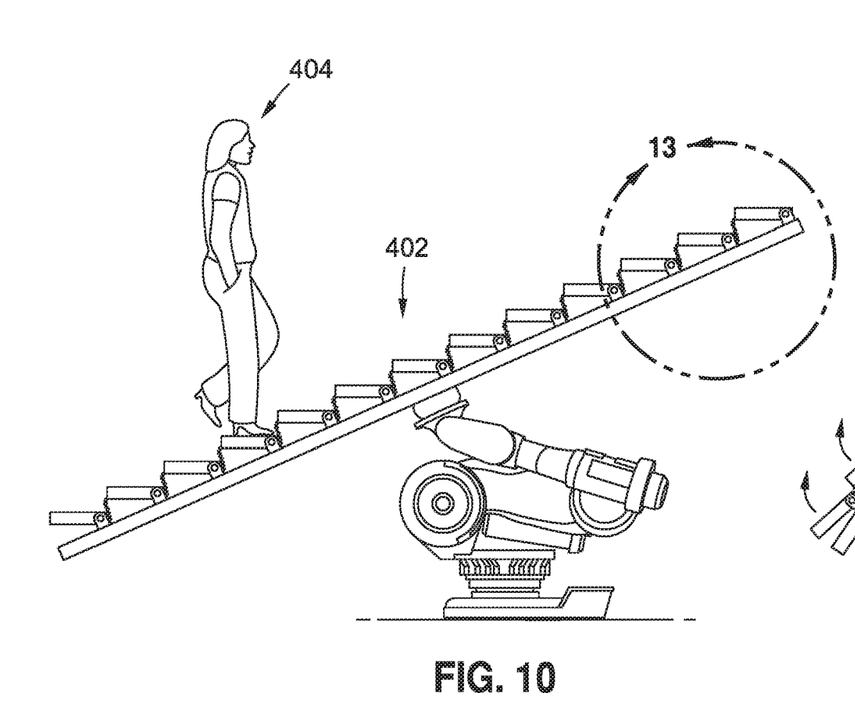
FIG. 10 illustrates a side view perspective of a robotically controlled convertible panel in a step or stair configuration or position.

Referring to FIG. 10, the convertible display possesses the dual purpose and capability of functioning both as a display and as steps or a staircase 402 to allow a person 404 to ascend and descend thereon. In one embodiment, the convertible display may thus function as either an electronic display 302 or a staircase 402. In a preferred embodiment, the sub-display elements or panels 302(*a*)-302(*m*) (or at least a display or front face thereof) are positioned flat (or parallel or flush with the support panel 304) when the electronic display 302 is intended to function as a display (with each face 306 of the sub-display element in the same plane as all of the other sub-display elements).

Figure 11:
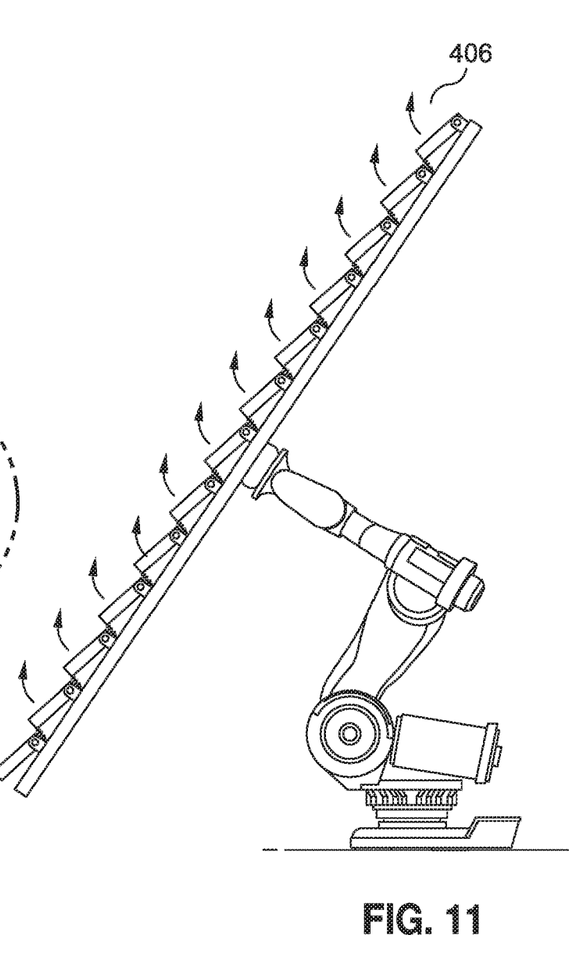
FIG. 11 illustrates a side view perspective of a robotically controlled convertible panel in an operational mode of converting from a planar configuration to a staircase configuration.

As shown in FIG. 11, when the convertible display is intended to function as a staircase 402, one or more of the sub-display elements or panels 302(*a*)-302(*m*) are rotated outwardly 406 from the support panel 304 so that they extend into different planes (which planes are at angles relative to the original or display plane).

Preferably, the mount 324 allows for the movement of the convertible display along and/or about, three axes. When the functional purpose of the convertible display is to function as an electronic display 302, the convertible display can be positioned, accordingly, through the motion of the mount 324 in any number of orientations for the intended purpose. If the functional purpose is to perform as a staircase 402, then the mount 324 can at another moment in time be re-positioned to the same or a different orientation that is appropriate for the use of the staircase 402.

Most importantly, one or more sub-display elements 302(a)-302(m) are movable between a first position and a second position, such as by an arrangement or mounting of the sub-display elements 302(a)-302(m) and a drive, such as one or more means for moving.

Figure 12:
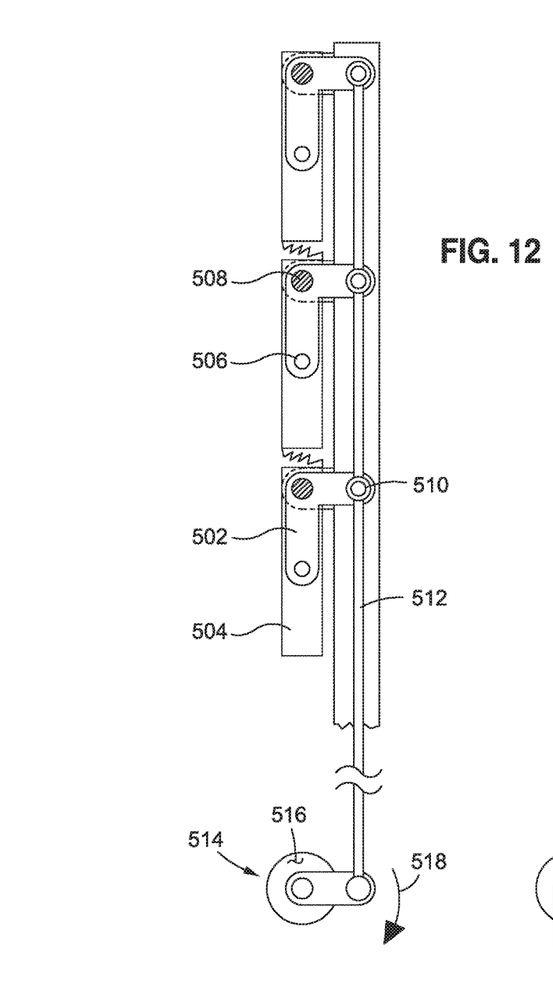
FIG. 12 illustrates a side view section of the convertible panel in a planar configuration.

One example of a mounting for the sub-display elements 302(a)-302(m) will be described with reference to FIG. 12. FIG. 12 illustrates an enlarged view of a portion of the convertible display. In this position, all of the sub-display elements 302(a)-302(m) (or at least the front display faces thereof) generally extend in the same plane, preferably being oriented flat or parallel to the support panel 304. In a preferred embodiment, each sub-display element 302(a)-302(m) is attached to an L bracket 502 on both lengthwise ends of the sub-display elements 302(a)-302(m) (only one end shown). Each of the sub-display elements 302(a)-302(m) are attached at attachment point 506 along one end from the vertex through one of the faces of the L bracket 502 to securely and immovably support the sub-display element 302(a)-302(m) and at attachment point 508 coinciding substantially with the vertex of the L bracket 502. Attachment between the L bracket 502 and sub-display elements 302(a)-302(m) may be through any fastener comprising a bolt, screw, rivet, metallic bonding, glue or other means of attachment known to those skilled in the art. A third attachment point 510 of the L bracket attaches substantially at the other end from the vertex to an actuator rod 512. The actuator rod 512 is of sufficient length to extend from the actuator rod's origin of actuation to the attachment point 510 of the furthest sub-display element 302(a)-302(m). Each of the L brackets 504 of the sub-display elements 302(a)-302(m) are securely attached to the actuator rod 512 so that the linear motion of the actuator rod translates the motion to the L bracket 504 at the attachment point 510. In a preferred embodiment, at least two (2) actuator rods 512 would provide actuation at least at both sides of the convertible display to translate linear motion to all of the L brackets 504 simultaneously and uniformly at both ends of the sub-display elements 302(a)-302 (m).

Figure 13:
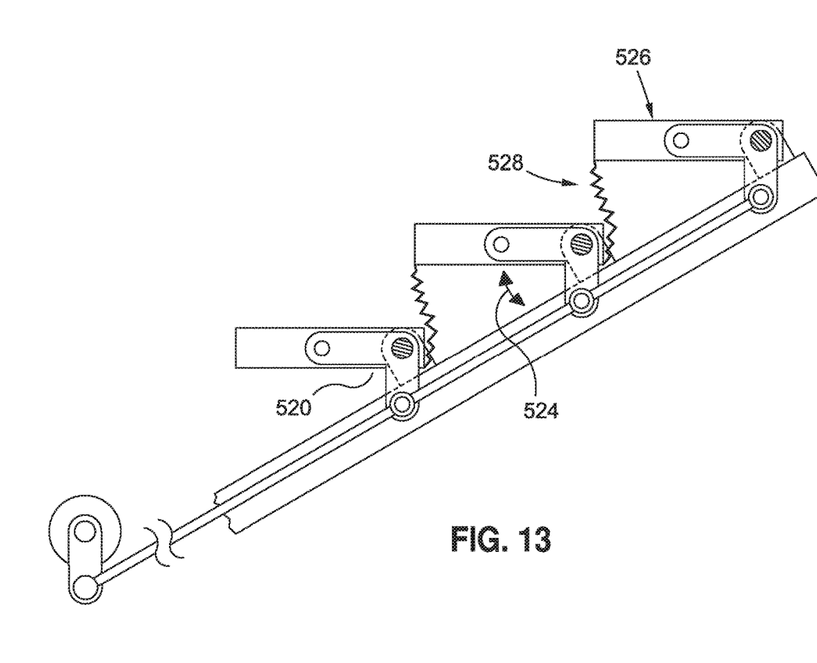
FIG. 13 illustrates a side view section of the convertible panel in a staircase configuration.

The actuator mechanism 514 shown in FIG. 12 translates the rotational motion of a means for moving 516 to linear motion of the actuator rod 512. Although a wheel and axle type actuator mechanism is depicted in FIG. 13 (such as may be implemented by an electric motor having a rotating output shaft), other types of means for moving/actuation can be used, including pneumatic, hydraulic, electro-mechanical, other forms of mechanical devices, such as linear or cam or screw-type actuators, and the like. Further, one or more motor driven devices may cause each of the sub-display elements 302(a)-302(m) to rotate to the respective positions. When in operation, the actuator wheel 516 is put into rotational motion 518 causing the actuator rod 512 to move in the direction of the actuator mechanism 514. The L bracket 502, though held securely in position for linear motion in relation to the actuator rod 512, maintains the ability for rotational motion about attachment point 510. Linear motion of the actuator rod 512 upon activation of the actuator mechanism 514 causes the L bracket 502 to move towards actuator mechanism 514 from the pulling force exerted at attachment point 510. Support 522 attached to the L bracket 502 at attachment point 508 and affixed to the support panel 504 secures the L bracket 502 at attachment point 508, preventing linear motion while maintaining the ability to provide rotational motion about attachment point 508. As actuator rod 512 is in motion, the L bracket 502 rotates about attachment point 510 and about attachment point 508 causing sub-display elements 302(a)-302(m) to rotate away from the support panel 304 with the L bracket to an angle shown at 524. The actuator rod 512 and sub-display elements 302(a)-302(m) may be locked in place through a locking mechanism (not shown), or via locking of the means for moving/drive element, to prevent the L brackets 504 and sub-display elements 302(a)-302(m) from rotating beyond the angle 524 or collapsing back towards the original position. The angle 524 is preferably selected in combination with the position of the support surface 304 so that a step surface 526 (comprising the face of one or more of the sub-display elements or panels 302(a)-302(m)), is maintained parallel to the floor for ease of ascent and descent. Adjustments in angle 524 are made through the actuator mechanism 514 and thus the degree of translational motion of the actuator rod 512. If the mount 324 rested on a surface or floor angled to the ground, the angle 524 need not be maintained parallel to the floor but could be adjusted to through the actuator mechanism 514 to ensure the step 526 is maintained parallel to the ground or otherwise generally horizontal.

Means for locking actuator mechanisms 514 are well known and may be used to lock the actuator rod 512 and sub-display elements 302(a)-302(m) in the desired electronic display 302 or staircase 402 position. Methods and devices of locking the rotational hinge 520 in place may also be used to assist in or to singularly lock sub-display elements 302(a)-302(m) in the electronic display 302 and staircase 402 positions. The locking mechanism may include a definite or indefinite number of rigid locking points to allow the angle between the sub-display elements 302(a)-302(m) and support panel 304 to vary. Detent mechanisms and other mechanical lock and release mechanisms may be used in association with rotational locking hinge 520 to adjust the angular position of the sub-display elements 302(a)-302(m). Such mechanisms may be further controlled by an electronic controller which sends instructions to locking mechanism to lock the sub-display elements in place once a specified amount of rotational travel has been reached. In other embodiments, locking may be achieved by locking or fixing the drive mechanism, such as the drive motor.

The presently discussed embodiment has been described as pulling the actuator rod 512 towards the actuator mechanism 514. In another embodiment, the actuator mechanism could push the actuator rod from the opposite end shown in FIG. 12 and FIG. 13 to achieve the same result.

When the convertible display is in its electronic display 302 configuration, it can assume any of the features and characteristics of the singularly functional electronic display 25 describe above and shown in FIG. 1, and possess any of the same advantages. Similarly, when the convertible display is in its staircase configuration 402, it can assume any of the features and characteristics of the staircase 222 described above and shown in FIG. 6, and possess any of the same advantages.

To operate, the electronic display 302 receives a video input signal. Each of the sub-display elements 302(a)-302(m) displays image information or graphics. The image information may be the same, but in a preferred embodiment the sub-display elements 302(a)-302(m) display a fractional portion of an entire video image, such that the sub-display elements 302(a)-302(m) cooperate to display one or more combined images or information.

In one embodiment, bellows 528 or other elements may be use to mask or hide the space below or between each sub-display 302(a)-302(m) and the underlying support 304 when the sub-displays 302(a)-302(m) are raised. The bellows 528 might comprise, for example, pleated fabric or other material which can be extended upwardly as each sub-display 302(a)-302(m) is rotated outwardly from the support 304, and which collapses when the sub-displays 302(a)-302(m) are collapsed back to their flat, display position.

Connectors (not shown) or other communication links (which could also be wireless) allow data associated with a video input signal to communicate across or to each sub-display element 302(a)-302(m) so that one or more images (static or moving images), including a fully contiguous image, may be presented. Upon re-positioning of the sub-display elements 302(a)-302(m) to the staircase 402 position, a switch (not shown) may terminate the video signal thereby preventing further display in each of the sub-display elements 302(a)-(m). In another embodiment, there is no switch or an optional switch so that video display may remain present within each sub-display element even while primarily functioning as a staircase.

In another embodiment, the controller could send instructions to the actuator mechanism 514 as to when the electronic display 302 is to be converted to the staircase 402. Concurrently with such instructions, the controller could provide additional instructions to re-orient the electronic display 302 to the require orientation needed for the staircase 402. Thus, while the actuator mechanism 514 is rotating the sub-display elements 302(a)-302(m) to reposition the sub-display elements for use as individual steps 526, the mount 324 is moving its various member arms to place the staircase 402 in proper position for ease of ascent and descent by a person 404. It will be appreciated that in a preferred embodiment, regardless of the position or orientation of the convertible display, when the display is used as a staircase, the faces of those sub-display elements or panels 302(a)-302(m) which are rotated are preferably located in generally horizontal planes for supporting a user (e.g. if the convertible display is oriented at 45 degrees relative to a generally horizontal support surface or the ground, then the sub-display elements would be rotated outwardly by about 45 degrees so that the faces thereof would be generally horizontal; if the display were oriented at 30 degrees relative to a generally horizontal supporting surface then the sub-display elements would be rotated outwardly by about 30 degrees so that the faces thereof would be generally horizontal, etc.)

In yet another embodiment, multiple convertible displays could be attached to multiple mounts 324. The use of multiple electronic displays 302 to multiple mounts 324 has been described herein. However, programmed changes to the convertible displays may occur whereby one of the convertible displays is converted to a staircase 402 in a coordinated manner with the convertible displays that remain positioned as electronic displays 302. Further programmed changes may occur such that the one or more convertible displays positioned as a staircase 402 may convert back to an electronic display 302 and vice versa. This could occur while a person or performer was coordinating their movements in association with the changes to the convertible displays.

In a further embodiment, two or more convertible displays could be used in combination to establish a combined staircase 402 that ascends to a greater height or lower depth than that which could otherwise be achieved with only one convertible display mounted to one mount 324. Alternatively, a combination of staircases 402 may establish alternating spans of ascent and descent. These combination staircases 402 could further be combined with electronic displays 302 in any variety of combinations.

In another embodiment, the electronic controller of the mount 324 could cause the convertible display when functioning as a staircase 402 to be used as a lift to further increase the height in which a person could ascend (e.g. the controller may jointly or cooperatively control the configuration of the convertible display and its position or orientation via the robotic mount). Thus, the while a person 404 is ascending or standing still on the staircase 402, the robotic arm(s) could move the mount in a vertical direction thereby raising the staircase heights beyond the height that otherwise would have been obtained by reaching the highest step of the staircase while the mount remained at rest. These features might have best application to move a person from the floor to a location that would have been otherwise unattainable from the floor position through the limited vertical length of the staircase 402. Additionally, the electronic controller could cause the angle of the staircase 402, as measured by the support panel 304, to increase relative to the floor thereby further increasing the attainable height.

It will be appreciated that not all of the sub-displays 302(a)-302(m) need to be movable. For example, depending upon the size or height of the sub-displays 302(a)-302(m), every other sub-display 302(a)-302(m) might be movable. In such a situation, one or more sub-display elements or panels which are between raised panels may comprise the step "rise", wherein the rise between adjacent raised sub-display elements or panels 302(a)-302(m) may still be acceptable for use as stairs.

Of course, one or more convertible displays may be utilized without robotic mounts. For example, a convertible display could be fixedly mounted (i.e. position in a single location). In a preferred embodiment, however, the convertible display is associated with a robotic mount which allows the position of the entire robotic display to be changed.

In accordance with the invention, a robotic mount is advantageously configured to move one or more entertainment elements, preferably in three-dimensions. The entertainment elements may thus be "animated", providing a much higher level of entertainment value. For example, the movement of one or more video displays adds entertainment value to the information or images displayed by the one or more video displays. Likewise, the movement of one or more video projectors allows the location of projected images to change, thus adding excitement to the images themselves. Similarly, the movement of a staircase may be used to entertain observers or riders of the staircase. Further, having a convertible display provides dual functionality of an electronic display and a staircase and provides the ability to have these functions interact to provide further entertainment value.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of converting a generally planar panel to a staircase comprising the steps of:

providing a robotic convertible panel comprising a plurality of sub-panels supported by a common support, said common support mounted to a robotic mount, said robotic mount configured to move said common mount, and thus said plurality of sub-panels, about each of an x axis, a y axis and a z axis which are perpendicular to one another;

positioning said plurality of sub-panels in a first position in which a face of each of said plurality of sub-panels is positioned in a first common plane to define a generally planar panel which is movable by said robotic mount; and rotating two or more of said sub-panels to a second position in which said faces thereof are in separate planes from one another and which are offset at an angle relative to said first plane, whereby said faces of said two or more of said sub-panels thereof may be used as step surfaces of the staircase which is movable by said robotic mount.

2. The method in accordance with claim 1 wherein said sub-panels comprise video display panels.

3. The method in accordance with claim 1 wherein said plurality of sub-panels are generally rectangular in shape.

4. The method in accordance with claim 1 wherein said first common plane is generally vertical.

5. The method in accordance with claim 1 wherein said angle is selected so that said faces of said two or more sub-panels are generally horizontal.

6. The method in accordance with claim 1 wherein all of said sub-panels are movably mounted to said common support and are moved to said second position.

7. The method in accordance with claim 1 wherein said robotic mount comprises a base, a moveable support connected to said base, said moveable support comprising at least a first portion, a second portion and a third portion, each of said first, second and third portions movable relative to one another and each portion moveable about at least one axis, whereby said moveable support is configured to move about each of an x axis, a y axis and a z axis which are all perpendicular to one another, and at least one motor configured to move said first, second and third portions of said moveable support.

8. The method in accordance with claim 1 wherein said two or more sub-panels each have a top edge and a bottom edge and said step of rotating comprises rotating said two or more sub-panels about said top edge.

9. The method in accordance with claim 8 wherein said step of rotating comprises activating a drive mechanism.

10. The method in accordance with claim 1 further comprising expanding a bellows below each of said two or more sub-panels when in said two or more sub-panels are in their second position.

11. A robotic panel convertible into a staircase, comprising:
a support structure;
a plurality of sub-panels connected to said support structure, each sub-panel having a face, said plurality of sub-panels when in a first position having their faces positioned in a first common plane and cooperating to define a generally planar panel;
two or more of said sub-panels movably mounted to said support structure;
at least one drive which rotates said two or more sub-panels from said first position to a second position in which said faces of said two or more sub-display panels are in separate planes from one another, the separate planes being offset at an angle relative to said first common plane, whereby said faces of said two or more of said sub-panels thereof are configured to be used as step surfaces of the staircase; and
said support structure mounted to a robotic mount, said robotic mount configured to move said support structure, and thus said plurality of sub-panels, in 6 degrees of freedom.

12. The robotic panel in accordance with claim 11 wherein said sub-panels comprise video display panels.

13. The robotic panel in accordance with claim 11 wherein all of said sub-panels are movably mounted.

14. The robotic panel in accordance with claim 13 wherein said robotic mount comprises a base, a moveable support connected to said base, said moveable support comprising at least a first portion, a second portion and a third portion, each of said first, second and third portions movable relative to one another and each portion moveable about at least one axis, whereby said moveable support is movable about each of an x axis, a y axis and a z axis which are all perpendicular to one another, and at least one motor moving said first, second and third portions of said moveable support.

15. The robotic panel in accordance with claim 11 wherein said two or more sub-panels are mounted for pivotal movement relative to said support structure.

16. The robotic panel in accordance with claim 15 wherein said at least one drive causes said two or more sub-panels to pivot from said first position to said second position.

17. The robotic panel in accordance with claim 14 further comprising a controller which controls said at least one robotic mount and said at least one drive in cooperation with one another.

18. The robotic panel in accordance with claim 11 wherein said support structure comprises a generally planar support panel having a top and a bottom, one of said plurality of sub-panels located at said top of said support panel and another of said plurality of sub-panels located at said bottom of said support panel.

19. The robotic panel in accordance with claim 18 wherein said support panel is positioned in a second plane which is parallel to, but offset from said first common plane.

20. The robotic panel in accordance with claim 18 wherein said plurality of sub-panels are located at a front of said support panel.

\* \* \* \* \*